(12) United States Patent
Tsai

(10) Patent No.: US 8,082,417 B2
(45) Date of Patent: Dec. 20, 2011

(54) METHOD FOR REDUCING PIN COUNTS AND MICROPROCESSOR USING THE SAME

(75) Inventor: Jiann-Jong Tsai, Hsinchu County (TW)

(73) Assignee: Sunplus mMedia Inc., Hsinchu (TW)

( * ) Notice: Subject to any disclaimer, the term of this patent is extended or adjusted under 35 U.S.C. 154(b) by 388 days.

(21) Appl. No.: 12/414,354

(22) Filed: Mar. 30, 2009

(65) Prior Publication Data

US 2009/0282219 A1 Nov. 12, 2009

(30) Foreign Application Priority Data

May 7, 2008 (TW) ................................ 97116734 A

(51) Int. Cl.
*G06F 12/02* (2006.01)
(52) U.S. Cl. ................... 711/211; 365/230.02
(58) Field of Classification Search ........................ None
See application file for complete search history.

(56) References Cited

U.S. PATENT DOCUMENTS

| | | | | |
|---|---|---|---|---|
| 4,839,856 A | * | 6/1989 | Tanaka | 711/211 |
| 5,524,228 A | * | 6/1996 | Maruyama et al. | 711/220 |
| 6,564,285 B1 | * | 5/2003 | Mills et al. | 711/103 |
| 6,778,463 B2 | * | 8/2004 | Chen | 365/230.06 |
| 6,895,465 B2 | * | 5/2005 | Hashimoto et al. | 711/105 |
| 2006/0129701 A1 | * | 6/2006 | Qawami et al. | 710/4 |

* cited by examiner

*Primary Examiner* — Gary Portka
(74) *Attorney, Agent, or Firm* — Muncy, Geissler, Olds & Lowe, PLLC

(57) ABSTRACT

The present invention relates to a microprocessor with reduced pin counts. The microprocessor transmits a higher bit address, a lower bit address and data via a common port so that a pin for transmitting the higher bit address is omitted. In an embodiment of the present invention, a new higher bit address latching signal is added in order to latch the higher bit address so that an original lower bit address latching signal and the higher bit address latching signal can respectively latch the lower bit address and the higher bit address.

8 Claims, 6 Drawing Sheets

METHOD FOR REDUCING PIN COUNTS AND MICROPROCESSOR USING THE SAME

This application claims priority of No. 097116734 filed in Taiwan R.O.C. on May 7, 2008 under 35 USC 119, the entire content of which is hereby incorporated by reference.

BACKGROUND OF THE INVENTION

1. Field of Invention

The present invention relates to a microprocessor, and more particularly to a microprocessor with reduced pin counts.

2. Related Art

Recently, the technology is progressing rapidly. The technology of the single-chip microprocessor is applied to many consumer electronic products, such as televisions, displays or even motors.

FIG. 1 shows pins of a conventional 8032 single-chip microprocessor. Referring to FIG. 1, several important pins will be introduced. The pins P0.0 to P0.7, P1.0 to P1.7, P2.0 to P2.7 and P3.0 to P3.7 are respectively the pins of four ports, including port(0), port(1), port(2) and port(3). The symbols beginning with P0 correspond to the port(0), the symbols beginning with P1 correspond to the port(1), the symbols beginning with P2 correspond to the port(2), and the symbols beginning with P3 correspond to the port(3). The pin ALE outputs a lower bit address latch control signal for controlling an external latch to latch a lower bit address bus outputted from the port P0. The pin PSEN outputs a program access enable control signal to enable an external memory so that a data access operation on the external memory can be performed.

FIG. 2 is a circuit block diagram showing the conventional 8032 single-chip microprocessor. Referring to FIG. 2, the circuit includes an 8032 single-chip microprocessor 201, a latch circuit 202 and a flash memory 203.

FIG. 3 shows waveforms used in the circuit of FIG. 2. Generally speaking, as shown in FIGS. 2 and 3, the port P0 (P0[7] to P0[0]) is used for outputting lower bit addresses A0 to A7 to the external memory (the flash memory 23), and performing the data access operation on the flash memory 203. The port P2 (P2[7] to P2[0]) is used for outputting higher bit addresses A8 to A15.

During the data access operation on the flash memory 203, four clocks T1 to T4 constitute a cycle. As the clock T1 rises, the voltage of the access enable pin PSEN is changed from the logic low voltage to the logic high voltage. At this time, the data bus of the flash memory 203 is in the high impedance state. Next, the voltage of the address latch pin ALE is also changed from the logic low voltage to the logic high voltage, while the microprocessor 201 starts to output the lower bit addresses A0 to A7 from the port P0. Then, the microprocessor 201 starts to output the higher bit addresses A8 to A15 from the port P2 at the rising edge of the clock T2. Then, when the voltage of the address latch pin ALE is changed from the logic high voltage to the logic low voltage, the lower bit addresses A0 to A7 are latched by the latch circuit 202. Finally, the port P0 is set to the high impedance state at the rising edge of the clock T2. When the voltage of the access enable pin PSEN is changed from the logic high voltage to the logic low voltage, the flash memory 203 outputs or writes data according to the /WR control signal.

According to the above-mentioned operations, it is obtained that the microprocessor 201 needs at least 19 pins to maintain the above-mentioned operation. When the product is being researched and developed, the software often needs to be updated. Thus, it is more flexible to adopt the external flash memory 203. During the implement of the product, the software needs not to be updated. Thus, the software is directly written into the microprocessor 201. For example, the original 8032 microprocessor is replaced with the 8051 microprocessor. However, the above-mentioned microprocessor 201 still has extra 19 pins left after the product has been developed. So, the following defects will be caused.

First, the area of the integrated circuit of the microprocessor cannot be reduced. In the integrated circuit, the number of bonding pads has to be greater than or equal to the pin counts, so the die size of the integrated circuit cannot be effectively reduced.

Second, the layout of the product is restricted. After the product has been developed, the opportunity of using these pins (P0.1 to P0.8; P2.1 to P2.8) is relatively decreased. However, these pins still have to occupy a relative large area to cause the restriction in the layout of the printed circuit board.

SUMMARY OF THE INVENTION

It is therefore an object of the present invention to provide a microprocessor with reduced pin counts, wherein the number of pins may be reduced according to higher bit addresses, lower bit addresses and a data common bus so that the layout area of the integrated circuit can be reduced.

The present invention achieves the above-identified object by providing a microprocessor with reduced pin counts. The microprocessor includes a micro-processing core circuit, a delaying circuit, a multiplexer, a common bus port, a first address latch pin, a second address latch pin, a read/write control pin and an access enable pin. The micro-processing core circuit includes a higher bit address bus and a lower bit address/data bus, and generates a first address latching signal, a read/write control signal and an access enable signal. The delaying circuit receives the first address latching signal, delays the first address latching signal by a default time and then outputs a second address latching signal. The multiplexer receives the higher bit address bus and the lower bit address/data bus and includes a common bus. The multiplexer electrically connects the lower bit address/data bus to the common bus according to the second address latching signal when the second address latching signal is enabled, and the multiplexer electrically connects the higher bit address bus to the common bus according to the second address latching signal when the second address latching signal is disabled. The common bus port has eight pins and is connected to the common bus of the multiplexer. The first address latch pin is for outputting the first address latching signal. The second address latch pin is for outputting the second address latching signal. The read/write control pin is for outputting the read/write control signal. The access enable pin is for outputting the access enable signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
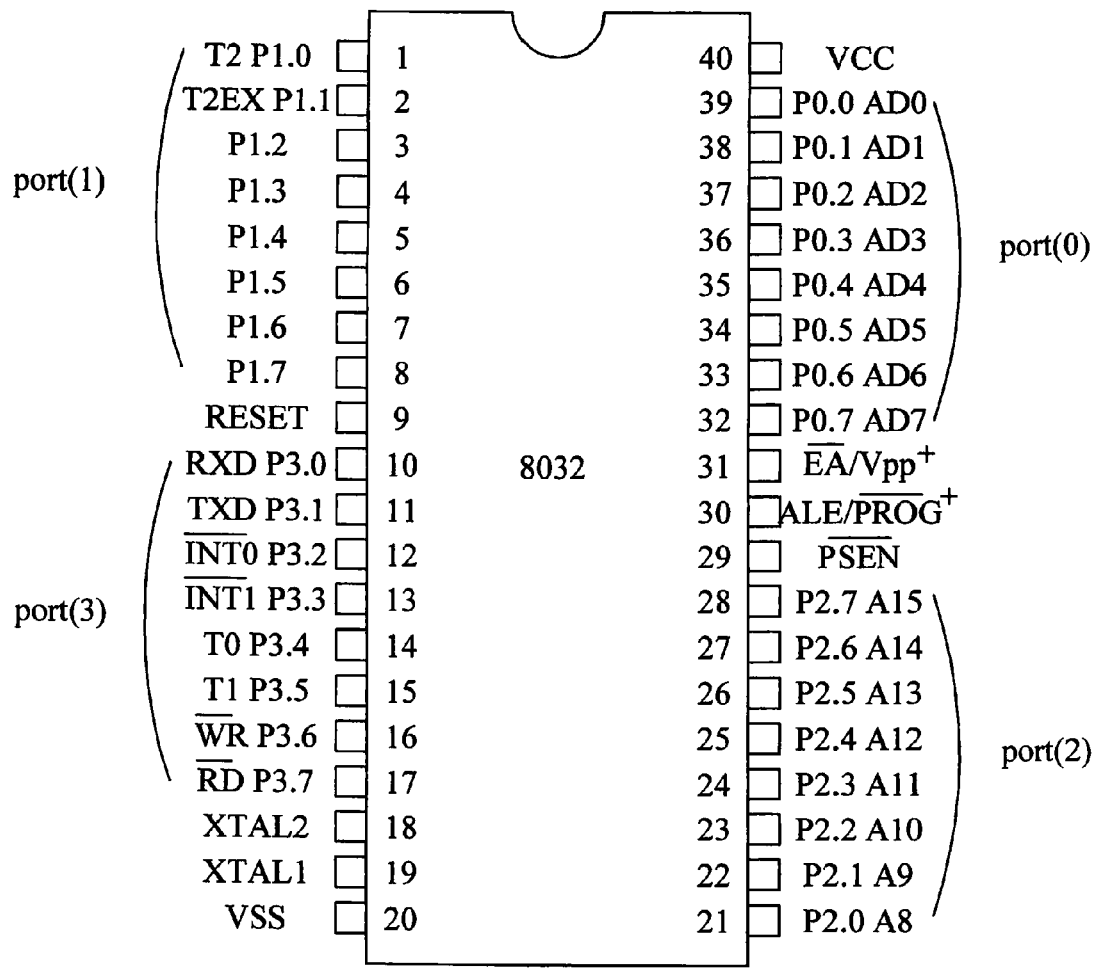
FIG. 1 shows pins of a conventional 8032 single-chip microprocessor.
Figure 2:
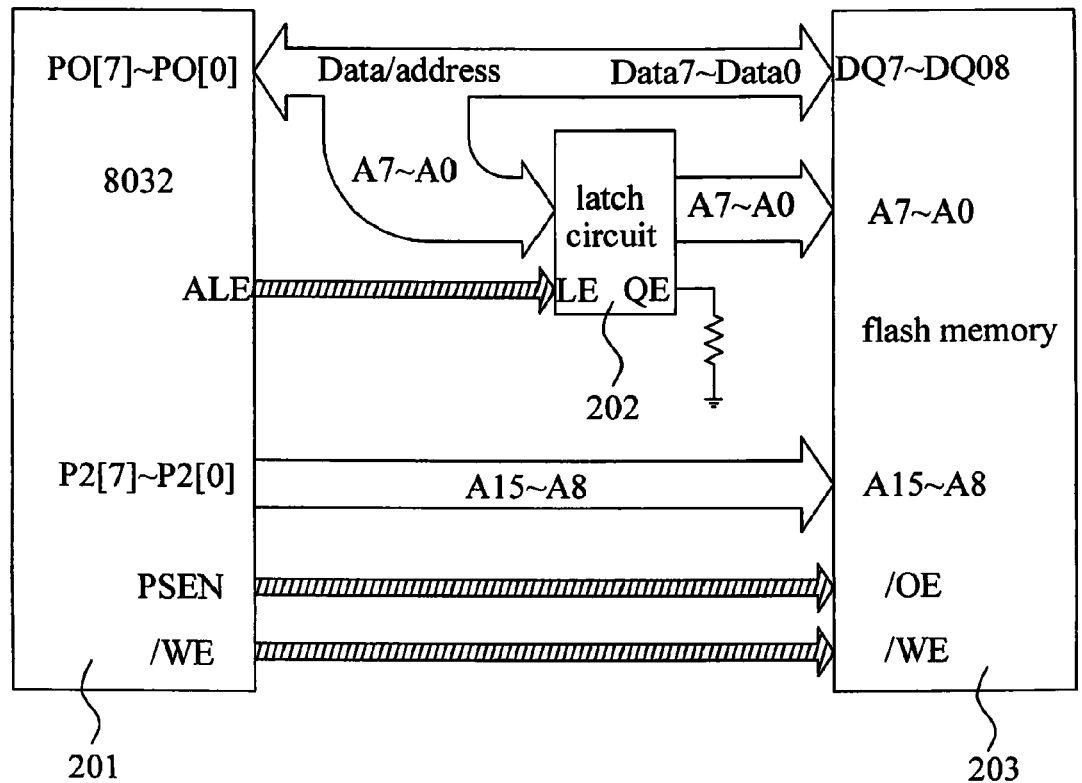
FIG. 2 is a circuit block diagram showing the conventional 8032 single-chip microprocessor.
Figure 3:
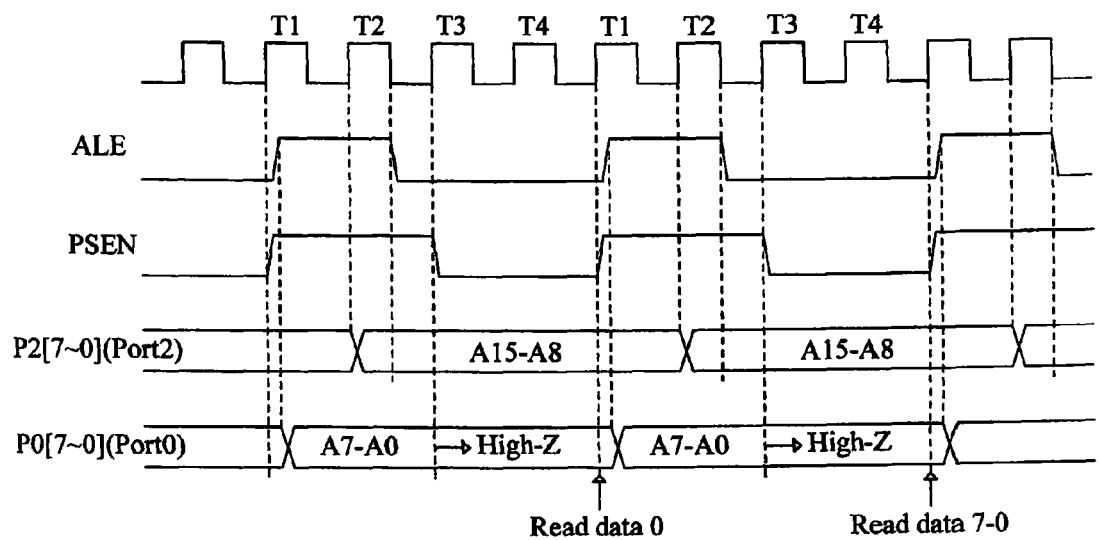
FIG. 3 shows waveforms used in the circuit of FIG. 2.
Figure 4:
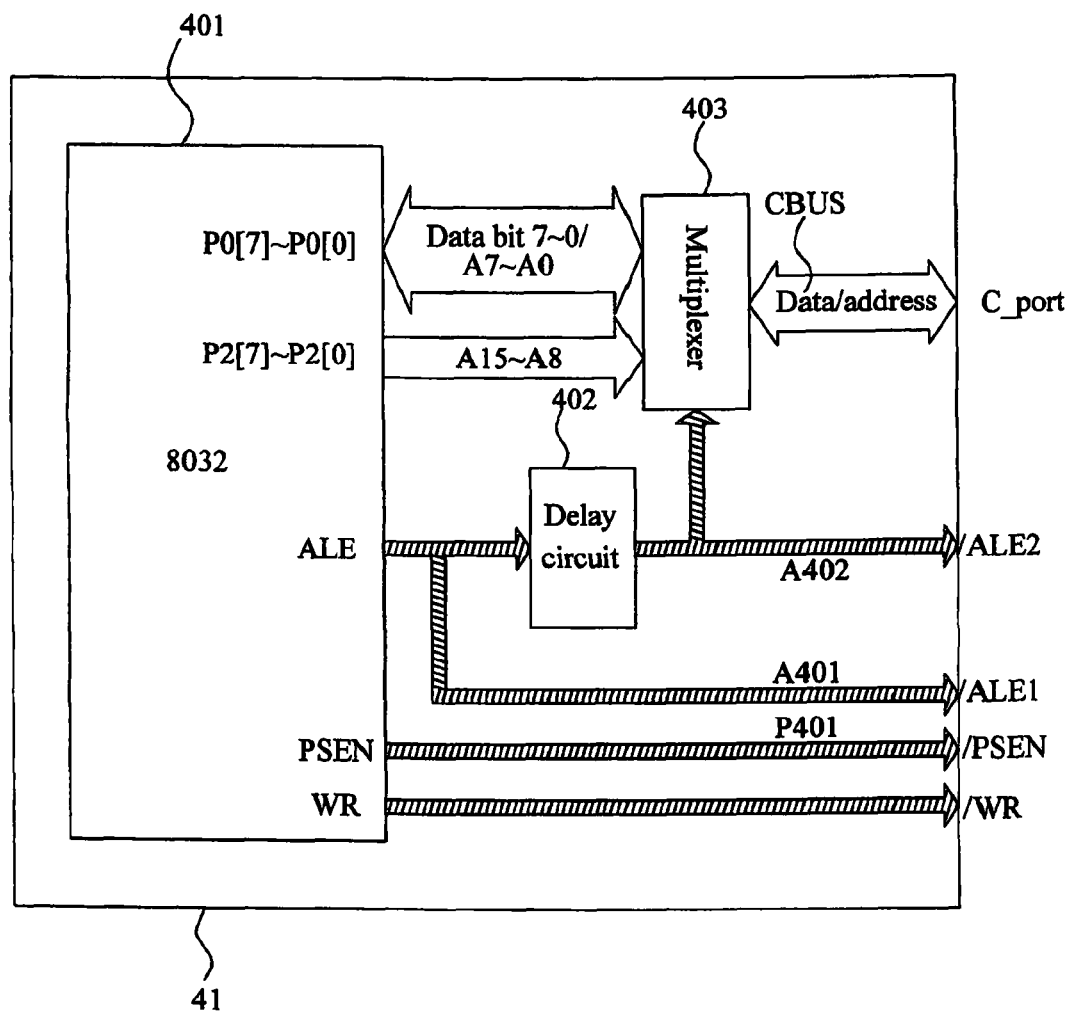
FIG. 4 is a circuit diagram showing a microprocessor 41 according to an embodiment of the present invention.

FIG. 4 is a circuit diagram showing a microprocessor 41 according to an embodiment of the present invention. Referring to FIG. 4, the microprocessor 41 includes a micro-processing core circuit 401, a delaying circuit 402, a multiplexer 403, a common bus port bus, a first address latch pin /ALE1, a second address latch pin /ALE2, a read/write control pin /WR and a program access enable pin /PSEN. In this embodiment, the micro-processing core circuit 401 is a core of 8032 microprocessor. As mentioned hereinabove, this microprocessor has a higher bit address bus (P2[7] to P2[0]), a lower bit address/data bus (P0[7] to P0[0]), an address latch end ALE, a read/write control end WR and a program access enable end PSEN. The address latch end ALE outputs a first address latching signal A401. The program access enable end PSEN outputs an access enable signal P401. The read/write control end /WR outputs a read/write control signal.

The delaying circuit 402 receives the address latching signal A401, delays the address latching signal A401 by a default time, and then outputs a second address latching signal A402. The multiplexer 403 is coupled to the higher bit address bus (P2[7] to P2[0]) and the lower bit address/data bus (P0[7] to P0[0]), and shares the buses via a common bus CBUS. A common bus port C_port has eight pins connected to the common bus CBUS of the multiplexer 403. The first address latch pin /ALE1 is coupled to the address latch end ALE and for outputting the first address latching signal A401. The second address latch pin /ALE2 is coupled to the delaying circuit 402 and for outputting the second address latching signal A402 outputted from the delaying circuit 402.

Figure 5:
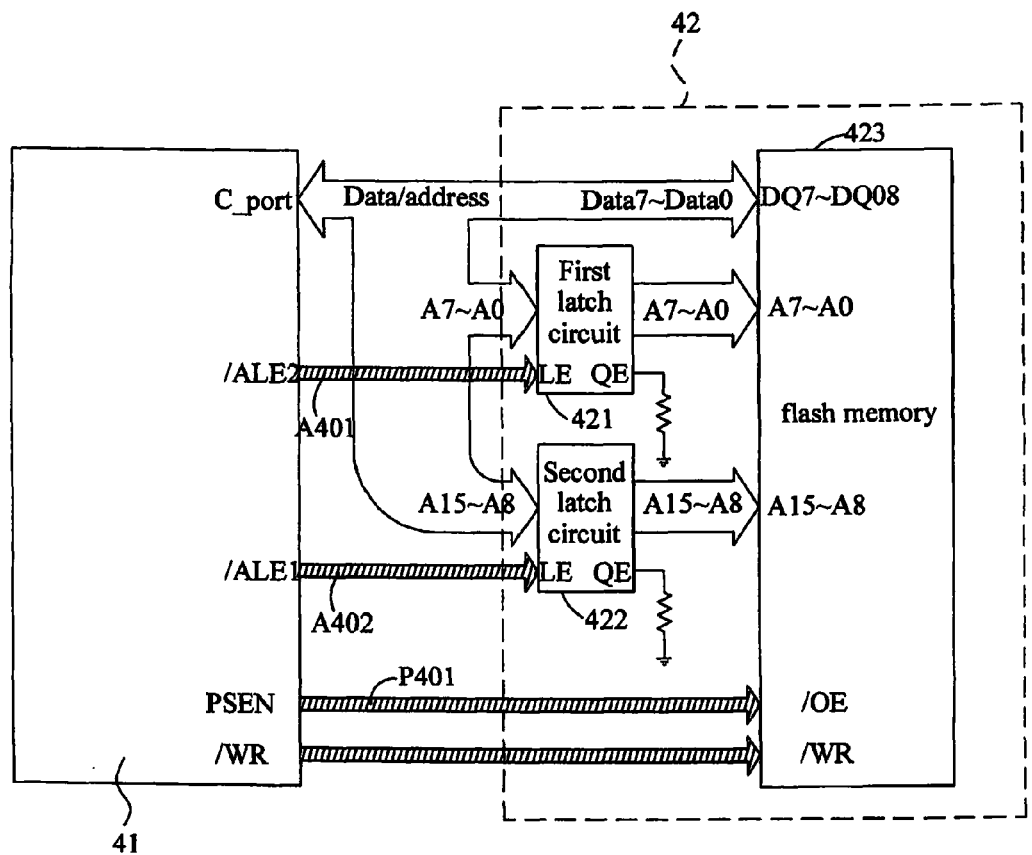
FIG. 5 is a system circuit diagram showing an external memory and the microprocessor according to the embodiment of the present invention.

FIG. 5 is a system circuit diagram showing an external memory and the microprocessor according to the embodiment of the present invention. Referring to FIG. 5, the circuit includes the microprocessor 41 and an external memory circuit 42, which includes a first latch circuit 421, a second latch circuit 422 and a flash memory 423. The output pins of the microprocessor 41 include the common bus port C_port, a first address latch pin ALE1, a second address latch pin ALE2, the read/write control pin /WR and the program access enable pin PSEN. The spirit of the present invention will be described by taking the microprocessor 41, which accesses the external memory circuit, as an example.

Figure 6:
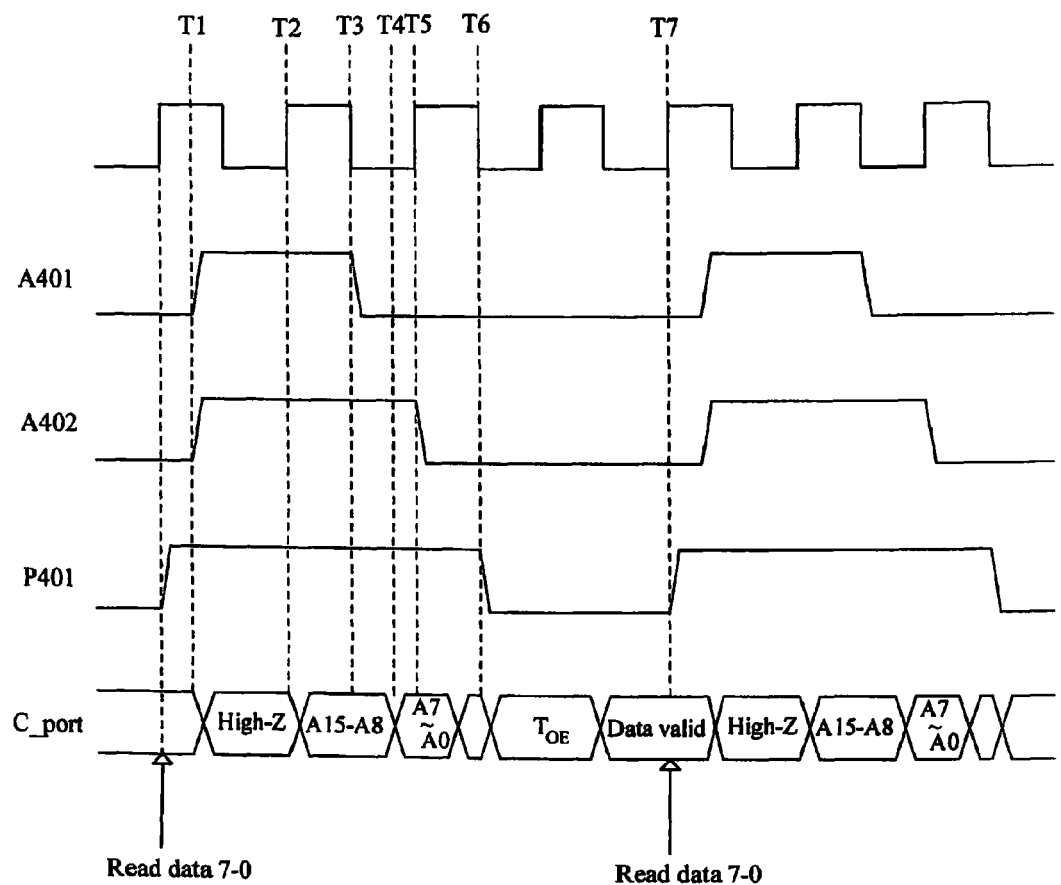
FIG. 6 shows operation waveforms used in FIGS. 4 and 5 according to the preferred embodiment of the present invention.

FIG. 6 shows operation waveforms used in FIGS. 4 and 5 according to the preferred embodiment of the present invention. As shown in FIGS. 4 to 6, when the microprocessor 41 starts to perform the data access operation (e.g., data read operation) on the external memory circuit 42, the following steps have to be performed. First, the microprocessor 41 changes the access enable signal P401 from the logic low voltage to the logic high voltage via the access enable pin /PSEN, while the flash memory 423 is in the disabled state. Next, after a predetermined time T1, the microprocessor 41 controls the first address latching signal A401 and the second address latching signal A402 to change from the logic low potential to the logic high potential. Next, at the time T2, the microprocessor 41 outputs higher bit addresses A8 to A15 from the common port C_port. At the time T3, the microprocessor 41 controls the first address latching signal A401 to change from the logic high potential to the logic low potential to make the second latch circuit 422 latch the higher bit addresses A8 to A15. At the time T4, the microprocessor 41 outputs lower bit addresses A0 to A7 from the common port C_port. At the time T5, the delaying circuit 402 of the microprocessor 41 controls the second address latching signal A402 to change from the logic high potential to the logic low potential to make the first latch circuit 421 latch the lower bit addresses A0 to A7. At the time T6, the microprocessor 41 controls the access enable signal P401 to change from the logic high potential to the logic low potential. Thereafter, the microprocessor 41 determines to read or write by controlling the voltage of the read/write control pin /WR. Heretofore, at the time T7, the flash memory 423 may further output the corresponding data to the common port C_port according to the lower bit addresses A0 to A7 and the higher bit addresses A8 to A15.

According to the above-mentioned embodiment, it is obtained that seven pins have been reduced although the multiplexer 403 and the delaying circuit 402 are additionally added to the microprocessor 41. Correspondingly, seven bonding pads have been reduced. That is, the microprocessor 41 of this embodiment can successfully reduce the layout area of the integrated circuit and make the circuit layout of the system become easier.

In summary, the spirit of the present invention is to share the common port for transmitting the higher bit addresses and the lower bit addresses in the microprocessor, and to latch the higher bit addresses and the lower bit addresses by the additionally added two address latch pins, respectively. Thus, the number of pins can be reduced, and the layout area of the integrated circuit can be reduced. In addition, the circuit layout of the microprocessor may become easier.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A microprocessor, comprising:
   a micro-processing core circuit, which comprises a higher bit address bus and a lower bit address/data bus, for generating a first address latching signal, a read/write control signal and an access enable signal;
   a delaying circuit, for delaying the first address latching signal by a default time and then outputting a second address latching signal, wherein, when the first address latching signal is changed from a first logic potential to a second logic potential, the second address latching signal is changed from the first logic potential to the second logic potential, wherein, when the first address latching signal is changed from the second logic potential to the first logic potential, the second address latching signal is held at the second logic potential by the default time and then changed to the first logic potential;
a multiplexer, which is coupled to the higher bit address bus and the lower bit address/data bus, and comprises a common bus, wherein the multiplexer electrically connects the lower bit address/data bus to the common bus according to the second address latching signal when the second address latching signal is enabled, and the multiplexer electrically connects the higher bit address bus to the common bus according to the second address latching signal when the second address latching signal is disabled;
a common bus port, having a plurality of pins connected to the common bus of the multiplexer, wherein the number of the pin of the common bus port is the same as the number of signal lines of the common bus of the multiplexer;
a first address latch pin, for outputting the first address latching signal;
a second address latch pin, for outputting the second address latching signal;
a read/write control pin, for outputting the read/write control signal; and
an access enable pin, for outputting the access enable signal
wherein, the micro-processing core circuit, the delaying circuit, the multiplexer, the common bus port, the first address latch pin, the second address latch pin, the read/write control pin, and the access enable pin are disposed of an integrated circuit,
wherein, when the integrated circuit accesses a external memory circuit, the microprocessor sequentially outputs a high bit address carried by the higher bit address bus and a lower bit address carried by the lower bit address/data bus to the external memory circuit through the pins of the common bus port.

2. The microprocessor according to claim 1, wherein the common bus port has eight pins.

3. A microprocessor, the microprocessor comprising:
a common bus port comprises a plurality of pins;
a first address latch pin, for outputting a first address latching signal;
a second address latch pin, for outputting a second address latching signal, wherein, when the first address latching signal is changed from a first logic potential to a second logic potential, the second address latching signal is changed from the first logic potential to the second logic potential, wherein, when the first address latching signal is changed from the second logic potential to the first logic potential, the second address latching signal is held at the second logic potential by a default time and then changed to the first logic potential; and
a program access enable pin, for outputting a program access enable signal to enable an external memory circuit,
wherein the microprocessor comprises a micro-processing core circuit, a delaying circuit, a multiplexer and the common bus port, wherein the micro-processing core circuit, the delaying circuit, the multiplexer and the common bus port are disposed of an integrated circuit, and when the integrated circuit accesses the external memory circuit, the pins of the common bus port sequentially outputs a high bit address and a lower bit address,
wherein when the microprocessor accesses the external memory circuit, the microprocessor performs the operations of:

(a) disabling the program access enable signal;
(b) controlling the first address latching signal and the second address latching signal to change from a first logic potential to a second logic potential after a first predetermined time;
(c) outputting a higher bit address from the common bus port after a second predetermined time;
(d) controlling the second address latching signal to change from the second logic potential to the first logic potential after a third predetermined time;
(e) outputting a lower bit address from the common bus port after a fourth predetermined time;
(f) controlling the first address latching signal to change from the second logic potential to the first logic potential after a fifth predetermined time; and
(g) enabling the program access enable signal after a sixth predetermined time, and accessing the external memory circuit via the common bus port according to the lower bit address and the higher bit address,
wherein the first predetermined time, the second predetermined time, the third predetermined time, the fourth predetermined time, the fifth predetermined time, and the sixth predetermined time sequentially occur.

4. The microprocessor according to claim 3, further comprising:
the micro-processing core circuit having a program access enable end, an address latch end, a first port and a second port, wherein the address latch end is coupled to the first address latch pin for outputting the first address latching signal, and the program access enable end is coupled to the program access enable pin for outputting the program access enable signal;
the multiplexer having a first connection bus, a second connection bus, an output bus and a control end, wherein the first connection bus is coupled to the first port, the second connection bus is coupled to the second port and the output bus is coupled to the common bus port; and
the delaying circuit having an input terminal coupled to the address latch end, and an output terminal for outputting the second address latching signal, wherein:
when the first address latching signal is changed from the first logic potential to the second logic potential, the delaying circuit controls the second address latching signal to change from the first logic potential to the second logic potential; and
when the first address latching signal is changed from the second logic potential to the first logic potential, the delaying circuit delays a predetermined time and then controls the second address latching signal to change from the second logic potential to the first logic potential.

5. The microprocessor according to claim 3, further comprising:
a read/write control pin, for outputting a read/write control signal to control the external memory circuit to read or write data.

6. The microprocessor according to claim 4, further comprising:
a read/write control pin, for outputting a read/write control signal to control the external memory circuit to read/write data,
wherein the micro-processing core circuit further comprises a read/write control end for outputting the read/write control signal.

7. The microprocessor according to claim 3, wherein the external memory circuit comprises:

a first address latching circuit, having an input bus coupled to the common bus port, and a latch end coupled to the first address latch pin, wherein when the first address latching signal is changed from the second logic potential to the first logic potential, the first address latching circuit latches the lower bit address, which is outputted from the common bus port, to an output bus of the first address latching circuit;

a second address latching circuit, having an input bus coupled to the common bus port, and an latch end coupled to the second address latch pin, wherein when the second address latching signal is changed from the second logic potential to the first logic potential, the second address latching circuit latches the higher bit address, which is outputted from the common bus port, to an output bus of the second address latching circuit; and a non-volatile memory comprising a data bus, a lower bit address bus, a higher bit address bus and an enable pin, wherein the data bus is coupled to the common bus port, the lower bit address bus is coupled to the output bus of the first address latching circuit, the higher bit address bus is coupled to the output bus of the second address latching circuit, and the enable pin is coupled to the program access enable pin.

8. A method of decreasing pin counts in a microprocessor, which shares a common bus port, the method comprising the steps of:

providing a first address latch pin, for outputting a first address latching signal;

providing a second address latch pin, for outputting a second address latching signal, wherein, when the first address latching signal is changed from a first logic potential to a second logic potential, the second address latching signal is changed from the first logic potential to the second logic potential, wherein when the first address latching signal is changed from the second logic potential to the first logic potential, the second address latching signal is held at the second logic potential by a default time and then changed to the first logic potential; and providing a program access enable pin, for outputting a program access enable signal to enable an external memory circuit, wherein the microprocessor comprises a micro-processing core circuit, a delaying circuit, a multiplexer and the common bus port, wherein the micro-processing core circuit, the delaying circuit, the multiplexer and the common bus port are disposed of an integrated circuit, and when the integrated circuit accesses the external memory circuit, the pins of the common bus port sequentially outputs a high bit address and a lower bit address, when the microprocessor accesses the external memory circuit, the microprocessor performs the operations of:

(a) disabling the program access enable signal;

(b) controlling the first address latching signal and the second address latching signal to change from a first logic potential to a second logic potential after a first predetermined time;

(c) outputting a higher bit address from the common bus port after a second predetermined time;

(d) controlling the second address latching signal to change from the second logic potential to the first logic potential after a third predetermined time;

(e) outputting a lower bit address from the common bus port after a fourth predetermined time;

(f) controlling the first address latching signal to change from the second logic potential to the first logic potential after a fifth predetermined time; and (g) enabling the program access enable signal after a sixth predetermined time, and accessing the external memory circuit via the common bus port according to the lower bit address and the higher bit address, wherein the first predetermined time, the second predetermined time, the third predetermined time, the fourth predetermined time, the fifth predetermined time, and the sixth predetermined time sequentially occur.

* * * * *